US010496515B2

(12) United States Patent
Maya et al.

(10) Patent No.: US 10,496,515 B2
(45) Date of Patent: Dec. 3, 2019

(54) ABNORMALITY DETECTION APPARATUS, ABNORMALITY DETECTION METHOD, AND NON-TRANSITORY COMPUTER READABLE MEDIUM

(71) Applicant: KABUSHIKI KAISHA TOSHIBA, Tokyo (JP)

(72) Inventors: Shigeru Maya, Kanagawa (JP); Takeichiro Nishikawa, Kanagawa (JP); Ken Ueno, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 121 days.

(21) Appl. No.: 15/693,428

(22) Filed: Aug. 31, 2017

(65) Prior Publication Data

US 2018/0225166 A1 Aug. 9, 2018

(30) Foreign Application Priority Data

Feb. 3, 2017 (JP) .................... 2017-019005

(51) Int. Cl.
*G06F 11/00* (2006.01)
*G06F 11/34* (2006.01)
(Continued)

(52) U.S. Cl.
CPC ...... *G06F 11/3452* (2013.01); *G06F 11/3447* (2013.01); *G06F 17/18* (2013.01);
(Continued)

(58) Field of Classification Search
CPC ............... G06F 11/2263; G06F 11/277; G06F 11/3447; G06F 11/3452; G06F 17/18; G06N 3/0454; G06N 5/045; G06N 20/00
See application file for complete search history.

(56) References Cited

U.S. PATENT DOCUMENTS 8,515,719 B2  8/2013 Tamaki et al.
8,682,824 B2  3/2014 Shibuya et al.
(Continued)

FOREIGN PATENT DOCUMENTS

JP   07-013611    1/1995
JP   2000-181526  6/2000
(Continued)

OTHER PUBLICATIONS

Ahmad et al., "Real-Time Anomaly Detection for Streaming Analytics," arXiv 1607.02480v1 cs.AI (Jul. 8, 2016), 10 pages.
(Continued)

*Primary Examiner* — Marc Duncan
(74) *Attorney, Agent, or Firm* — Finnegan, Henderson, Farabow, Garrett & Dunner, L.L.P.

(57) ABSTRACT

An apparatus according to one embodiment of the present invention detects an abnormality of a monitoring target on the basis of state data of the target and includes an estimated data calculator, a deviation degree calculator, an abnormality degree calculator, and an abnormality determiner. The estimated data calculator calculates estimated data of a second period on the basis of the state data of the first period. The deviation degree calculator calculates a degree of deviation of the second period on the basis of the state data and the estimated data of the second period. The abnormality degree calculator calculates a degree of abnormality of the second period on the basis of the degree of deviation of the second period. The abnormality determiner determines presence or absence of an abnormality of the target in the second period on the basis of the degree of abnormality in the second period.

11 Claims, 15 Drawing Sheets

(51) Int. Cl.
*G06N 20/00* (2019.01)
*G06F 17/18* (2006.01)
*G06N 3/04* (2006.01)
*G06N 5/04* (2006.01)

(52) U.S. Cl.
CPC ........... *G06N 3/0454* (2013.01); *G06N 5/045* (2013.01); *G06N 20/00* (2019.01)

(56) References Cited

U.S. PATENT DOCUMENTS

| | | | |
|---|---|---|---|
| 10,366,346 B2* | 7/2019 | Achin | G06Q 10/04 |
| 2011/0119374 A1* | 5/2011 | Ruhl | G06Q 10/06 709/224 |
| 2011/0276828 A1* | 11/2011 | Tamaki | G05B 23/0254 714/26 |
| 2014/0336985 A1* | 11/2014 | Ide | G01M 99/008 702/183 |
| 2015/0095003 A1 | 4/2015 | Horowitz et al. | |
| 2015/0339265 A1* | 11/2015 | Thibaux | G06F 17/18 702/179 |
| 2015/0381648 A1* | 12/2015 | Mathis | H04L 41/145 726/22 |
| 2017/0031744 A1* | 2/2017 | Iyer | G06F 11/0751 |
| 2017/0161628 A1* | 6/2017 | Chiba | G06F 17/14 |

FOREIGN PATENT DOCUMENTS

| | | |
|---|---|---|
| JP | 2014-59910 | 4/2014 |
| WO | WO 2010/082322 A1 | 7/2010 |
| WO | WO 2013/010516 | 7/2013 |

OTHER PUBLICATIONS

Aggarwal, "Outlier Ensembles," ACM SIGKDD Explorations Newsletter (Apr. 30, 2013), 14:49-58.

Aminikhanghahi et al., "A survey of methods for time series change point detection," Knowl. Inf. Syst. (2017), 51:339-367.

Amozegar et al., "An ensemble of dynamic neural network identifiers for fault detection and isolation of gas turbine engines," Neural Networks (2016), 76:106-121.

* cited by examiner

| MEASUREMENT NUMBER | SENSOR A |
|---|---|
| t | 1.2 |
| t+1 | 2.3 |
| t+2 | 3.2 |
| t+3 | 2.4 |
| t+4 | 5.3 |
| t+5 | 4.5 |
| t+6 | 4.6 |
| t+7 | 4.3 |
| | |

| MEASUREMENT NUMBER | STATE VALUE |
|---|---|
| t-w+1 | 1.2 |
| t-w+2 | 2.3 |
| t-w+3 | 3.2 |
| t-w+4 | 2.4 |
| | |

| MEASUREMENT NUMBER | ESTIMATED VALUE (MODEL A) | ESTIMATED VALUE (MODEL B) |
|---|---|---|
| t | 5.6 | 6.1 |
| t+1 | 2.5 | 4.3 |
| t+2 | 7.2 | 4.2 |
| t+3 | 4.6 | 5.2 |
| | | |

FIG. 6

| MEASUREMENT NUMBER | STATE VALUE | ESTIMATED VALUE (MODEL A) | ESTIMATED VALUE (MODEL B) | ESTIMATED VALUE (MODEL C) | OPTIMUM ESTIMATED VALUE |
|---|---|---|---|---|---|
| t | 5.3 | 5.6 | 6.1 | 4.5 | 5.6 (MODEL A) |
| t+1 | 4.5 | 2.5 | 4.3 | 6.3 | 4.3 (MODEL B) |
| t+2 | 4.6 | 7.2 | 4.2 | 3.2 | 4.2 (MODEL B) |
| t+3 | 4.3 | 4.6 | 5.2 | 4.3 | 4.3 (MODEL C) |
| | | | | | |

FIG. 7

| MEASUREMENT NUMBER | SENSOR A | OPTIMUM ESTIMATED VALUE | ESTIMATION ERROR | OUTLIER DETERMINATION RESULT (YES/NO) |
|---|---|---|---|---|
| t | 1.2 | 1.4 | 0.04 | NO |
| t+1 | 2.3 | 2.7 | 0.16 | NO |
| t+2 | 3.2 | 3.4 | 0.04 | NO |
| t+3 | 2.4 | 6.4 | 16.0 | YES |
| t+4 | 5.3 | 6.3 | 1.0 | NO |
| t+5 | 4.5 | 3.6 | 0.81 | NO |
| t+6 | 4.6 | 1.2 | 11.5 | YES |
|  |  |  |  |  |

FIG. 16

ABNORMALITY DETECTION APPARATUS, ABNORMALITY DETECTION METHOD, AND NON-TRANSITORY COMPUTER READABLE MEDIUM

CROSS-REFERENCE TO RELATED APPLICATION(S)

This application is based upon and claims the benefit of priority from Japanese Patent Application No. 2017-019005, filed Feb. 3, 2017; the entire contents of which are incorporated herein by reference.

FIELD embodiments described herein relate generally to an abnormality detection apparatus, an abnormality detection method, and non-transitory computer readable medium.

BACKGROUND

Various types of data are acquired in real time by sensors with the progress of IoT (Internet of Things) in recent years. Such real-time data acquisition makes it possible to grasp a state of a monitoring target in real time.

Attempts have also been made to detect an abnormality of a monitoring target on the basis of chronological data (time series sensor data) acquired by sensors. However, in normal cases, most of the pieces of the time series sensor data are records of normality and rarely include records of abnormality. Also, since the number of sensors is enormous, the data volume of the time series sensor data also becomes enormous. In addition, since there are various patterns of data indicating abnormality (abnormal patterns), undiscovered, abnormal patterns may be included in the time series sensor data. Accordingly, it is not a good idea to manually create feature values of the individual abnormal patterns for detection of abnormality.

In view of the above, a scheme is used according to which, learning patterns (normal patterns) indicating the normality of the monitoring target are learned by using methodology such as a regression model, deep learning, etc. on the basis of learning state data indicative of a normal state of a monitoring target, and then an abnormality is detected on the basis of the degree of deviation of the time series sensor data relative to the normal patterns. According to this scheme, it is only necessary to acquire time series sensor data in normal states, and prior knowledge about abnormal patterns, sensors, etc. is not required. As a result, the scheme is expected to foe applied to various fields.

Also, in order to detect abnormality in real time, prediction of future normal patterns in advance is carried out. For example, a normal pattern at a predetermined time in the future is predicted on the basis of time series sensor data up to the present time. When the predetermined time is reached, the time series sensor data at the predetermined time is compared with the predicted normal pattern and a prediction error, which is the difference between them, is calculated. Such prediction is readily made when the monitoring target is in a normal state, so that the prediction error is expected to be small. Since the prediction is difficult when the monitoring target is abnormal, the prediction error is expected to be large. In this manner, the current prediction error can be calculated on the basis of the previously predicted normal patterns, and the current abnormality can be detected. Accordingly, abnormality can be detected in real time.

The accuracy of the abnormality detection based on the prediction error largely depends upon the prediction accuracy of an abnormality detection apparatus. However, it is difficult to improve the prediction accuracy with existing technology that makes prediction using a single deterministic model. For example, noise is often included even if sensor data that has been actually acquired is functioning normally, and the prediction accuracy deteriorates due to the noise. Also, even when the monitoring target behaves periodically, the cycle is not necessarily constant, so that the prediction may be temporally delayed. As a result, there may be cases where the prediction error is small even if the monitoring target is in an abnormal state, or the prediction error is large even if the monitoring target is in a normal state. Hence, it is difficult to accurately detect abnormalities relying upon the existing technology.

BRIEF DESCRIPTION OF THE DRAWINGS

FIG. 6 is a diagram for explanation of processing of an estimated value calculator.

FIG. 7 is a diagram for explanation of a method of calculating an optimum estimated value.

FIG. 16 is a diagram for explanation of the determination of an outlier.

DETAILED DESCRIPTION

An embodiment of the present invention provides an abnormality detection apparatus configured to calculate, using a plurality of state estimation models, a degree of deviation based on a plurality of estimated values, and detect an abnormality on the basis of the calculated degree of deviation.

An abnormality detection apparatus according to one embodiment of the present invention is an abnormality detection apparatus configured to detect an abnormality of a monitoring target on the basis of state data indicative of a state of the monitoring target. The abnormality detection apparatus includes an estimated data calculator, a deviation degree calculator, an abnormality degree calculator and an abnormality determiner. The estimated data calculator is configured to calculate estimated data of a second period following a first period on the basis of the state data of the first period using a plurality of state estimation models. The deviation degree calculator is configured to calculate a degree of deviation of the second period on the basis of the state data of the second period and the estimated data of the second period. The abnormality degree calculator is configured to calculate a degree of abnormality of the second period on the basis of the degree of deviation of the second period. The abnormality determiner is configured to determine presence or absence of an abnormality of the monitoring target in the second period on the basis of the degree of abnormality in the second period.

Below, a description is given of embodiments of the present invention with reference to the drawings. The present invention is not limited to the embodiments.

First Embodiment

Figure 1:
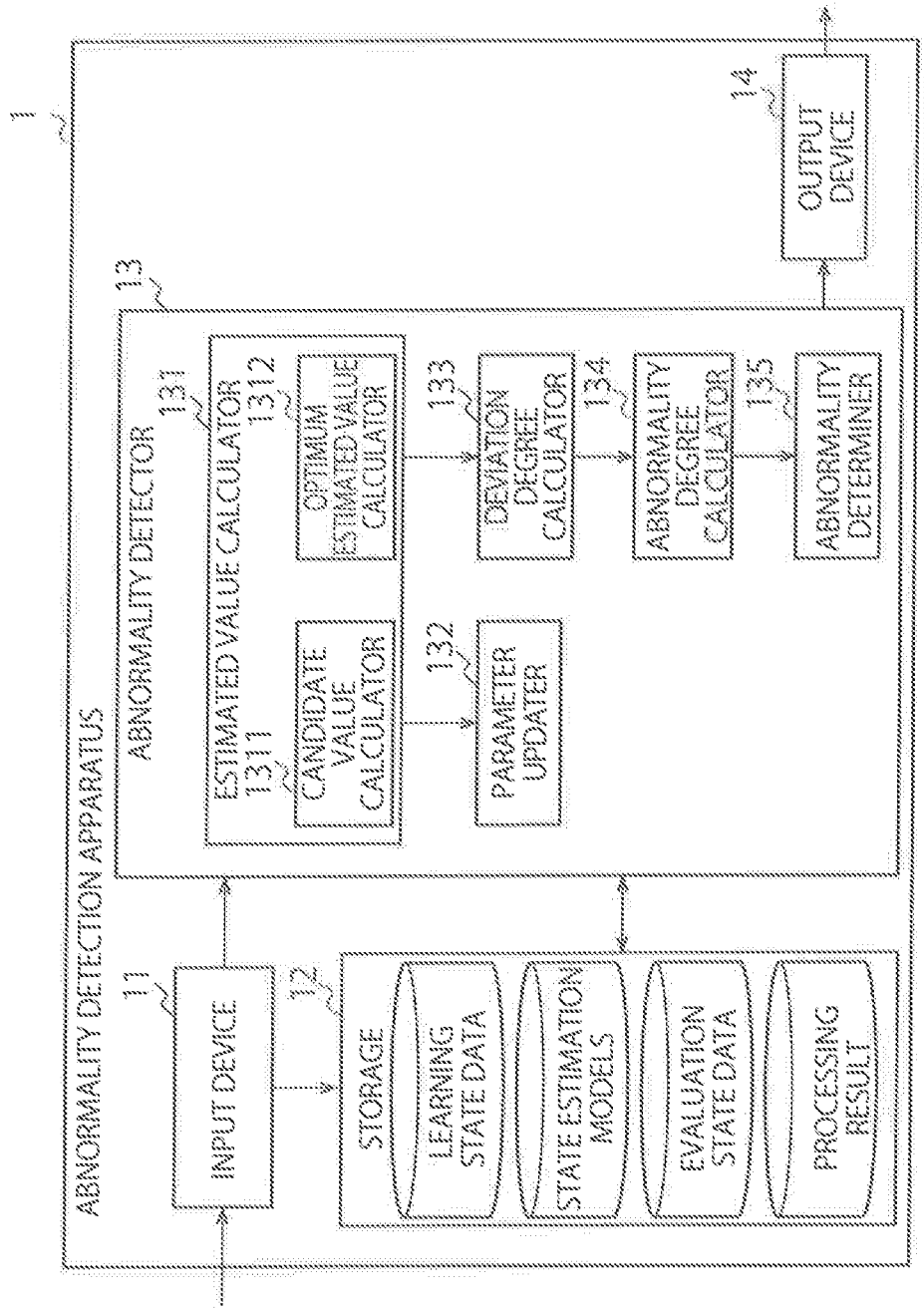
FIG. 1 is a block diagram illustrating an example or a schematic configuration of an abnormality detection apparatus according to a first embodiment.

FIG. 1 is a block diagram that illustrates an example of the abnormality detection apparatus according to a first embodiment. The abnormality detection apparatus 1 according to the first embodiment includes an input device 11, a storage 12, an abnormality detector 13, and an output device 14. The abnormality detector 13 includes an estimated value calculator 131, a parameter updater 132, a deviation degree calculator 133, an abnormality degree calculator 134, and an abnormality determiner 135. The estimated value calculator 131 includes a candidate value calculator 1311 and an optimum estimated value calculator 1312.

The abnormality detection apparatus 1 is an apparatus configured to detect an abnormality of a monitoring target on the basis of a value indicative of a state of the monitoring target. The value indicative of the state of the monitoring target is referred to as "state value." Also, time series data composed of the state values is referred to as "state data."

The monitoring target is not particularly limited as long as it has at least two states including normal and abnormal states. For example, the monitoring target may be devices such as a server, a home appliance, and the like. The monitoring target may also be a system composed of a plurality of devices. The monitoring target may also be part or all of a production line in a factory or the like. The monitoring target may also be a space of a building, room, and the like. The monitoring target may also be a living body such as a human being and an animal.

The items (types) of the states of the monitoring target indicated by the state values are not particularly limited as long as they can be used in determination of whether the monitoring target is normal or abnormal. For example, the items may include a temperature of the monitoring target, a moving speed of the monitoring target, and the like. One (univariate) item or multiple (multivariate) items may be included in the state data. For example, the state data may only include a state value related to temperature, or may include a state value related to the temperature and a state value related to the moving speed.

In addition, the abnormality detection apparatus 1 of the present embodiment uses state estimation models. The state estimation models estimate one or more state values in a subsequent period after a preceding particular period on the basis of one or more state values in the particular period. The state value of estimation which is estimated by the state estimation model is referred to as "estimated value." Also, time series data composed of the estimated values is referred to as "estimated data." The state of the monitoring target is estimated using the state estimation models, and an abnormality of the monitoring target is detected on the basis of the estimated state and the actual state.

It is assumed here that the state data includes state data for use in evaluation (hereinafter referred to as "evaluation state data") and state data for use in learning (hereinafter referred to as "learning state data"). It is also assumed that the state values (state values for use in evaluation, which are hereinafter referred to as "evaluation state value") of the evaluation state data are a value (actually measured value) that is actually measured by a sensor or the like. The evaluation state data is for use in detecting an abnormality. When the monitoring target is a device, the evaluation state value may be a value measured by the monitoring target device itself.

The sensors and the like are not particularly limited as long as they are capable of measuring desired items. For example, if being normal or abnormal is determined based on a temperature, the temperature measured by a temperature sensor should be included in the evaluation state data. For example, if being normal or abnormal is determined based on the movement of an object, an acceleration measured by an acceleration sensor should be included in the evaluation state data.

The state values (state values for use in learning, which are hereinafter referred to as "learning state value") of the learning state data are by definition a state value observed when the monitoring target is in a normal state. In other words, the learning state data does not include any state value observed when the monitoring target is in an abnormal state. In the present embodiment, it is assumed that parameters of the state estimation models are updated based on the learning state data. As a result, the estimated values that are estimated by the state estimation models will be a value observed when the monitoring target is in a normal state. The learning state data may be evaluation state data in a period where the monitoring target has been found to be in a normal state. Alternatively, the learning state data may be dummy data created from a range of values that should be measured when the monitoring target is in a normal state.

Figures 2, 3:
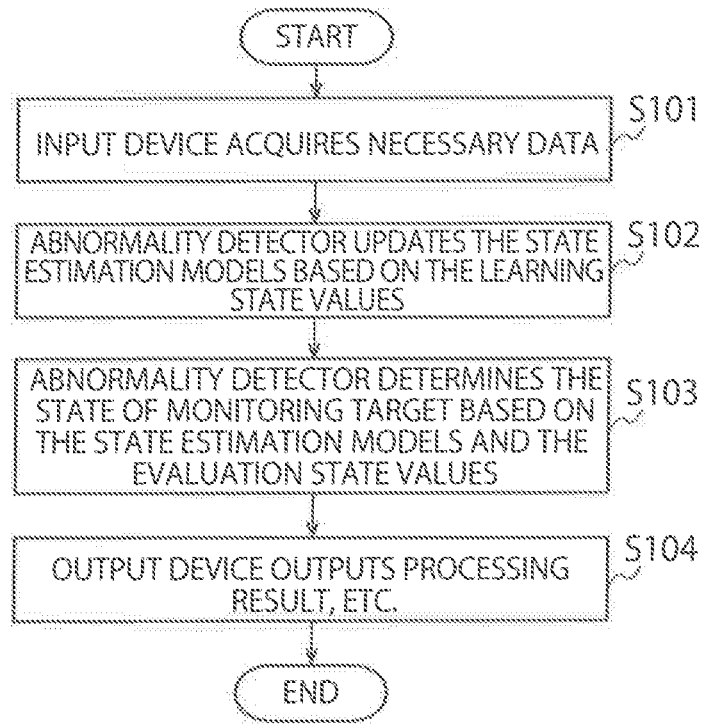
FIG. 2 is a diagram illustrating an example of state data.
FIG. 3 is a diagram illustrating an example of a flowchart of overall processing of the abnormality detection apparatus according to the first embodiment.

FIG. 2 is a diagram that illustrates an example of the state data. Measurement numbers are illustrated in the first column of the table illustrated in FIG. 2, where "t" represents a positive integer. It should be noted that the measurement time points at which the measurements were performed may be indicated in place of the measurement numbers. Values measured by the sensor A, i.e., the state values, are indicated in the second cells of the respective rows.

It should be noted that the state data may be processed by carrying out preprocessing. For example, normalization may be performed such that the average of the estimated values is 0 and the variance is 1 for each item. Alternatively, in the case where the state data is multivariate, whitening may be performed in which correlations between items are mutually incorporated. In addition, processing for removing a state value that is out of a predetermined range, frequency conversion, and the like may be performed.

The individual components of the abnormality detection apparatus 1 will be described below.

The input device 11 is configured to accept an input of information necessary for processing by the abnormality detector 13. Examples of the input information include learning state data, evaluation state data, the number of state estimation models to be used, initial values of parameters of the state estimation models, thresholds for detecting abnormality, and the like. Details of the inputted information will be in the context of the explanations of the components that use the information.

The information to be entered and the input format are not particularly limited. For example, an input may be accepted via a GUI (Graphical User Interface) displayed on a display or the like. A file including the information may be actively or passively acquired from an external device.

The input device 11 is configured to pass the inputted information to a predetermined reception destination. The reception destination may be the abnormality detector 13, the storage 12, or the output device 14.

Also, the input device 11 may be divided into multiple devices to handle the individual pieces of information to be acquired. Specifically, the abnormality detection apparatus 1 may include a plurality of input devices that receive specialized pieces of information. For example, the abnormality detection apparatus 1 may include a learning state data input device for acquiring the learning state data, an evaluation state data input device for acquiring the evaluation state data, an initial value input device for acquiring an initial value of a parameter of the state estimation model, a model number input device for specifying the number of the state estimation models to be used, or the like.

The storage 12 is configured to store the information received by the input device 11. Also, the storage 12 is configured to store the processing result of each component of the abnormality detector 13. In addition, the preprocessing of the above-described state data may be performed by the storage 12, or may be performed by a component of the abnormality detector 13 that uses the state data.

The storage 12 may be a single memory or storage device, a plurality of memory or storage devices, or a combination of memory or storage devices. Storage destinations may be sorted or grouped according to the stored information. The stored data may be managed as a database (DB). For example, there may be provided a state data DB that stores the state data. The learning state data and the evaluation state data may be individually extracted from the state data DB. Also, there may be provided a model storage DB that stores information on the state estimation model, a processing result DB that stores the results of each processing process of the abnormality detector 13, and the like.

The abnormality detector 13 is configured to perform processing for detecting an abnormality. The processing performed by the abnormality detector 13 includes "learning processing" and "abnormality detection processing." The learning processing refers to processing associated with learning variations of the learning state values. Specifically, the learning processing refers to processing associated with updating the parameters of the state estimation models on the basis of the learning state values. This processing improves the accuracy of the state estimation models. The abnormality detection processing refers to processing associated with detecting an abnormality based on the evaluation state values and the estimated values estimated by the state estimation models. Details of these processes will be described later in the context of each component of the abnormality detector 13.

Each component of the abnormality detector 13 may acquire information necessary for processing from the storage 12, from the input device 11, or may acquire information from other components of the abnormality detector 13. In addition, each component of the abnormality detector 13 may pass the result of the processing to a component that performs the next process, or may pass the processing result to the storage 12. For example, if the processing results of the respective components are stored in the storage 12, the processing results of the components can be confirmed via the output device 14.

The output device 14 is configured to output the result of processing by the abnormality detector 13. Examples of the output include a degree of abnormality at each time point, presence or absence of occurrence of abnormality, information on the state estimation models to be used, and the like. Information other than the processing result may also be output. The scheme of outputting by the output device 14 is not particularly limited. The output device 14 may display the processing result on a screen as an image or may save it as a file.

FIG. 3 is a diagram that illustrates an example of a flowchart of the overall processing of the abnormality detection apparatus 1 according to the first embodiment.

The input device 11 acquires data necessary for each process (S101). The abnormality detector 13 carries out the learning processing and updates the state estimation model based on the learning state values in the particular period (S102). The abnormality detector 13 carries out the abnormality detection processing based on the updated state estimation models and the evaluation state values to determine the state of the monitoring target (S103). As a result, any abnormality of the monitoring target can be detected. The output device 14 then outputs the processing result, etc. (S104).

It should be noted that, although the above flowchart describes a series of processing processes, the series of processing processes may end before the learning processing (S102) and the abnormality detection processing (S103) may be performed as independent processing processes, for the state estimation models have only to be updated before the abnormality detection processing (S103). Also, the abnormality detection processing may be repeated after the learning processing is performed once.

The components that perform the learning processing of the abnormality detector 13 will be described below. The learning processing is carried out by the estimated value calculator 131 and the parameter updater 132.

The estimated value calculator 131 calculates estimated values of the subsequent period following the preceding particular period on the basis of (i) the state values of the particular period, (ii) the state values of the subsequent period, and (iii) the state estimation models. The particular period is referred to as "estimation reference period," and the subsequent period is referred to as "estimation target period." The estimation target period should be a time period temporally later than the estimation reference period and may belong to the past, the present, or the future with reference to the time of calculation of the estimated data. For example, at the time of calculation the estimated data, the estimated data of a certain past period may be calculated based on the evaluation state data of another past period that precedes the certain past period.

It should be noted that the estimated value calculator 131 is associated with both the learning processing and the abnormality detection processing. In the learning processing, the estimated value calculator 131 acquires the learning state data and calculates the estimated values on the basis of the learning state values. The estimated values calculated based on the learning state values are referred to as "estimated value for learning." In the abnormality detection processing, the estimated value calculator 131 acquires the evaluation state data, and calculates the estimated values based on the evaluation state values. The estimated values calculated based on the evaluation state values are referred to as "estimated value for evaluation."

As mentioned above, it is assumed in the present embodiment that the estimated value calculator 131 is associated with both the learning processing and the abnormality detection processing. Meanwhile, the abnormality detection apparatus 1 may separately include an estimated-value-for-learning calculator for calculating the estimate values for learning and an estimated-value-for-evaluation calculator for calculating the estimated values for evaluation.

It is assumed here that the state estimation model used by the estimated value calculator 131 is stored in advance in the storage 12. It is also assumed here that a plurality of state estimation models are stored therein. As the state estimation models to be used, linear regression, kernel regression, deep learning, combinations thereof, and the like may be considered. As parameters of the state estimation models, for example, in kernel regression, designs of gram matrices, values of regularization terms, and the like may be mentioned. In the case of deep learning, the network structure, the number of layers, the type of an activation function, and the like may be mentioned.

In addition, the estimated value calculator 131 improves the accuracy of the estimated values by using multiple state estimation models. Accordingly, the estimated value calculator 131 includes a candidate value calculator 1311 and an optimum estimated value calculator 1312.

Figure 4:
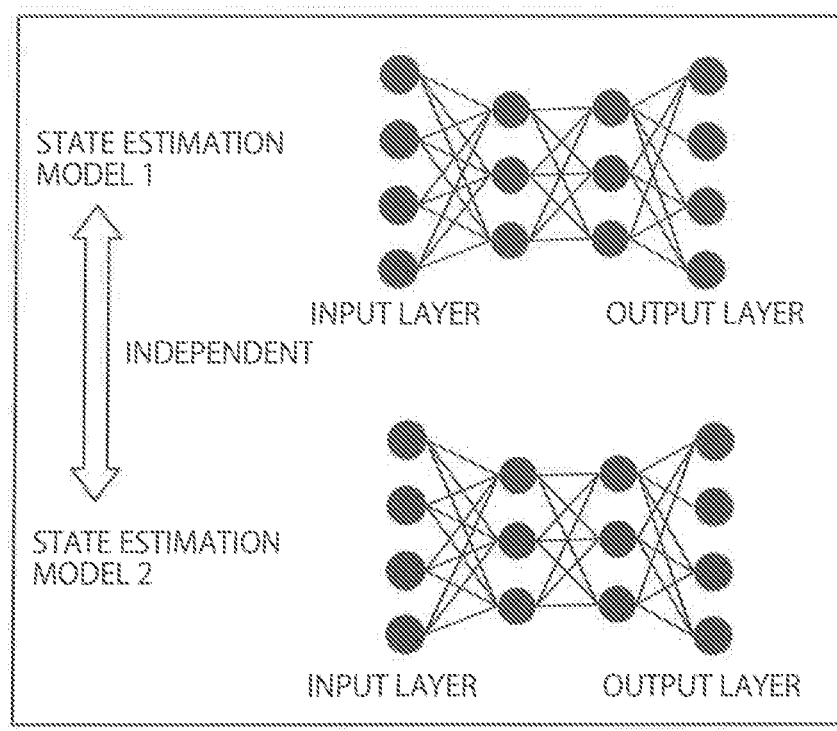
FIG. 4 is a diagram illustrating an example of a structure of a state estimation model by deep learning.
Figure 5:
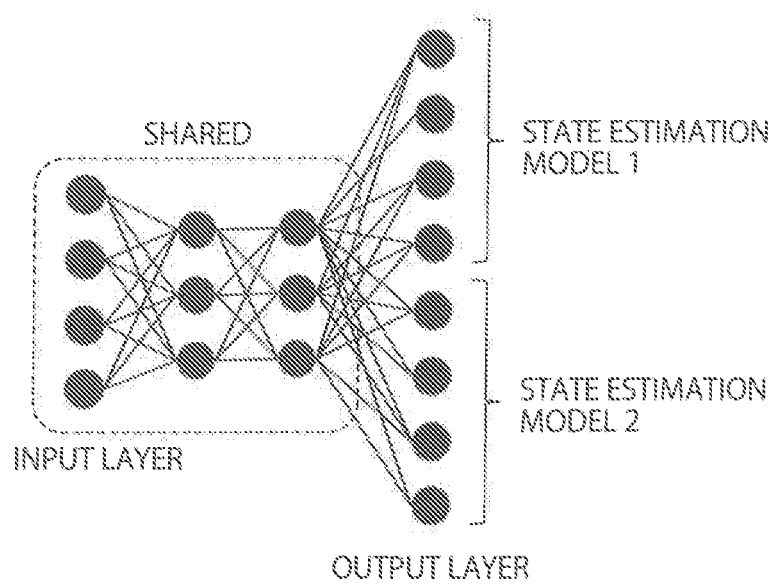
FIG. 5 is a diagram illustrating another example of the structure of the state estimation model by deep learning.

It should be noted that the state estimation models to be used may share a part of their structures. FIG. 4 is a diagram that illustrates an example of the structures of the state estimation models by deep learning. FIG. 4 illustrates an example in which two state estimation models do not share their structure. The state estimation model 1 and the state estimation model 2 illustrated in FIG. 4 are in an independent relationship with each other. FIG. 5 is a diagram that illustrates another example of the structures of the state estimation models by deep learning. The two state estimation models illustrated in FIG. 5 are the same from the leftmost layer (input layer) to the third layer from the left as indicated by the dotted frame, but different in their layers on the rightmost side (output layer). In other words, the state estimation model 1 and the state estimation model 2 illustrated in FIG. 5 share the layers other than the output layer. In this manner, the state estimation models to be used may be in an independent relationship or a relationship in which a part of the structure is shared. Although the deep learning illustrated in FIGS. 4 and 5 is a feed-forward-type structure, long short term memory (LSTM), or the like frequently used in time series analysis may be used as part of the layers.

The candidate value calculator 1311 of the estimated value calculator 131 is configured to calculate the estimated values within the estimation target period for each state estimation model on the basis of the state values within the estimation reference period. As a result, the estimated values are calculated for all of the estimated models to be used.

It should be noted that the candidate value calculator 1311 accepts the number of state values within the estimation reference period to be considered at one time. For example, when the specified number is 100, then 100 estimated values within the estimation target period are calculated per one state model from the 100 state values within the estimation reference period. In this case, the number of state values within the estimation reference period to be considered at one time is referred to as "estimation window width w." It should be noted that the length of time may be specified instead of the number of the state values. In addition, a period delimited by the estimation window width "w" is referred to as "estimation window."

FIG. 6 is a diagram for explanation of the processing of the candidate value calculator 1311. The table on the left side illustrates examples of the state data acquired by the candidate value calculator 1311. The table on the right side illustrates examples of the estimated data calculated by the candidate value calculator 1311. The values in the second column of the table on the left side are the state values input to the candidate value calculator 1311 and the values in the second column and the third column in the table on the right side are the estimated values calculated by the candidate value calculator 1311.

The number of the state estimation models to be used may also be specified. For example, when the input device 11 may display a screen for inputting the number of state estimation models and, if the number of the state estimation models to be used is specified as "n" (where "n" is a positive integer), then the candidate value calculator 1311 may select "n" state estimation models from the storage 12. The method of selecting the state estimation models is not limited. Also, the output device 14 may output the state estimation models stored in the storage 12, and the input device 11 may accept the specification of the state estimation models therefrom.

The optimum estimated value calculator 1312 is configured to calculate an estimated value regarded as being optimum from a plurality of estimated values. The estimated value regarded as being optimum is referred to as "optimum estimated value." As a method of calculating the optimum estimated value, a method of selecting an estimated value most suitable for a predetermined condition from a plurality of estimated values can be considered. In the present embodiment, the predetermined condition is based on the state value of the estimation target period.

It is conceivable that the condition for an estimated value to be selected as the optimum estimated value requires that the difference between the corresponding estimated value and state value be the smallest in the estimation target period. As exemplified by this difference, what indicates the difference between the estimated value of the estimation target period and the state value of the estimation target period is referred to as "estimation error." The method of calculating the estimation error is not limited to such a difference-based one. In the case of univariate, the estimation error may be calculated by signed difference, squared error, or the like. Also, in the case of multivariate, the estimation error may be calculated using the Mahalanobis distance incorporating the correlation between the sensors. Also, the range of the estimated value may be set as a condition and the optimum estimated value may not be selected if the estimated value with the smallest estimation error is not included in the range of the estimated value. In this way, more than one condition may be provided.

FIG. 7 is a diagram for explanation of the method of calculating the optimum estimated value. For each measurement number, the state value and the estimated value of each state estimation model are indicated. It is assumed in FIG. 7 that three state estimation models are used. It is also assumed that the estimated value having the closest value to the state value is selected as the optimum estimated value. Referring to measurement number "t," the state value is 5.3.

Among the estimated values of the state estimation models A, B, and C, the estimated value closest to this state value for the measurement number "t" is therefore the estimated value of the state estimation model A. Accordingly, the optimum estimated value of the measurement number "t" is 5.6, which is the estimated value of the state estimation model A. Likewise, the estimated values of the state estimation model B are the optimum estimated values for the measurement numbers "t+1" and "t+2," and the estimated value of the state estimation model C is the optimum estimated value for the measurement number "t+3." In this manner, the corresponding estimated value and state value are subjected to the determination according to the measurement numbers or the measurement times.

Instead of choosing the optimum estimated value for each measurement number, it is also possible to select an optimal state estimation model and use the estimated value according to the selected state estimation model as the optimum estimated value. For example, a state estimation model having the largest number of estimated values satisfying the condition may be selected as the best suited state estimation model.

For example, referring again to FIG. 7, if a state estimation model with the smallest sum of the squared errors of the measured value and the predicted value is used as the optimum state estimation model, the state estimation model B is selected as the optimum state estimation model. The estimated values of the state estimation model B will be the optimum estimated value at each measurement timing.

In addition, the optimum estimated value calculator 1312 may calculate the optimum estimated value by using a predetermined calculation formula instead of selecting the optimum estimated value. For example, on the basis of a plurality of estimated values, a weighted average value may be calculated and used as an optimum estimated value.

As described above, in the present embodiment, a plurality of estimated values are calculated by the candidate value calculator 1311, which are candidates for the optimum estimated value. Also, the optimum estimated value is calculated based on the state values in the estimation target period, not the estimation reference period. Accordingly, though they agree with each other in that the optimum estimated value is calculated using a plurality of state models, this embodiment can improve the accuracy of the optimum estimated value relative to other embodiments in which the optimum estimated value is calculated based on the state values of the estimation reference period.

As described above, the estimated value calculator calculates the estimated value of the estimation target period by the candidate value calculator 1311 and the optimum estimated value calculator 1312.

In the learning processing, the parameter updater 132 acquires estimated values which are based on the learning state values calculated by the optimum estimated value calculator 1312. The parameters of the state estimation models are then updated based on the estimated values. Known methods such as a quasi-Newton method and an error back propagation method may be used as the method of updating the parameters.

It should be noted that a predetermined value stored in the storage 12 may be used as the initial value of the parameters of the state estimation models before updating by the parameter updater 132. Alternatively, it may be acquired from an external device. For example, the value of the parameter calculated by an abnormality detection apparatus 1 which is different than the abnormality detection apparatus 1 may be used on an as-is basis.

Figure 8:
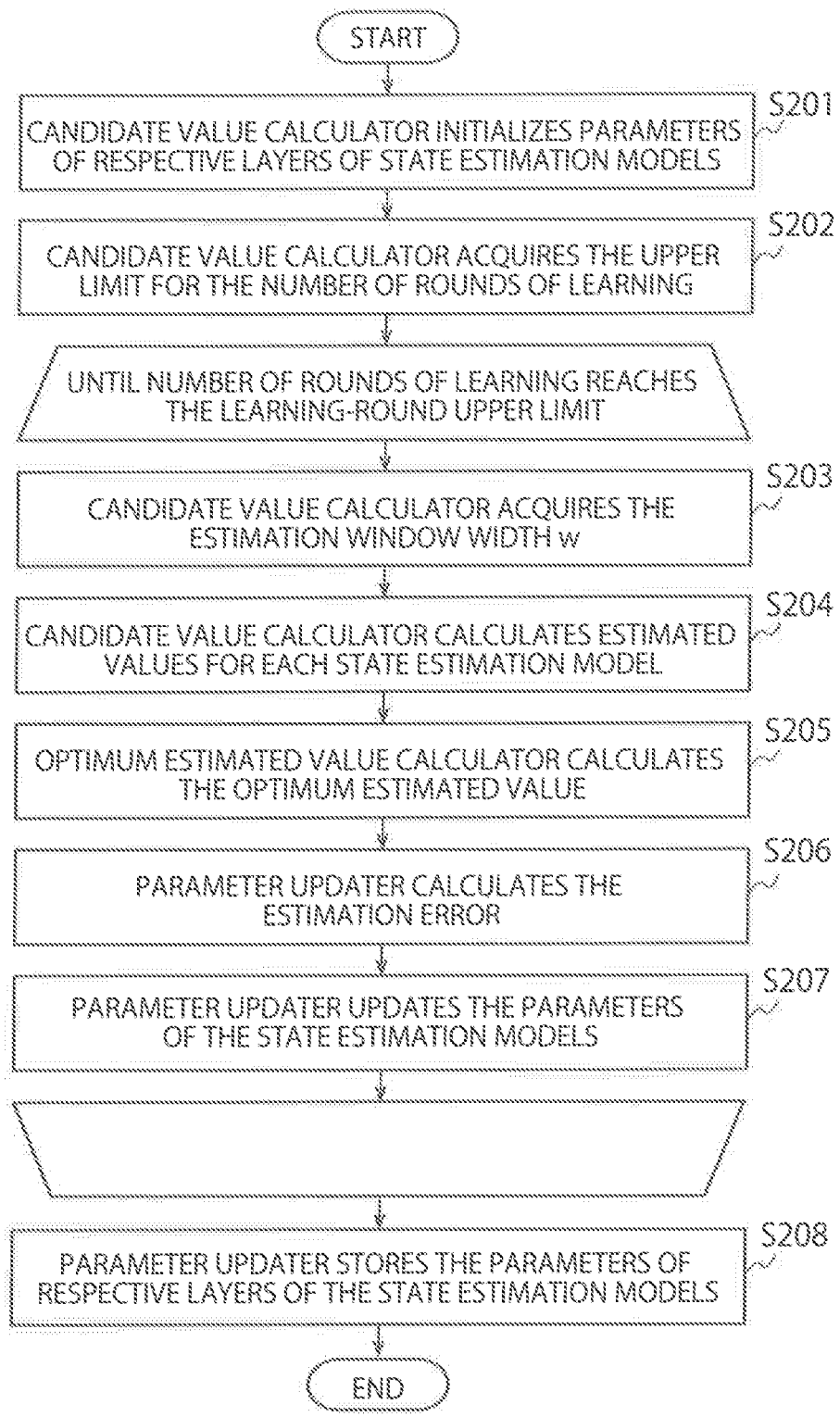
FIG. 8 is a diagram illustrating an example of a flowchart of learning processing.

FIG. 8 is a diagram that illustrates an example of a flowchart of the learning processing. This flow corresponds to the process of the step S102 of the flow illustrated in FIG. 3. This flow is assumed to take place when deep learning is used as the state estimation model.

The candidate value calculator 1311 initializes the parameters of the state estimation models (S201) and acquires the upper limit value for the number of rounds of learning (S202). The processing processes from S203 to S208 are repeated until the number of rounds of learning reaches the upper limit value.

The candidate value calculator 1311 acquires the estimation window width "w" (S203). The candidate value calculator 1311 calculates estimated values for learning within the estimation target period for each state estimation model on the basis of the learning state values within the estimation reference period (S204). Since the calculation is performed for each estimation window, the processing of S204 is performed for all the estimation windows within the estimation reference period. Thus, estimated values for each state estimation model are calculated over the entire estimation target period.

The optimum estimated value calculator 1312 calculates an optimum estimated value from the estimated values of each state estimation model on the basis of the learning state values in the estimation target period (S205). The parameter updater 132 calculates an estimation error based on the learning state values and the corresponding optimum estimated value in the estimation target period (S206). The learning state value and the optimum estimation value having the same measurement number or the same measurement time are in a corresponding relationship with each other. The parameter updater 132 then updates the parameters of the state estimation models so as to reduce the estimation error by using an error back propagation method or the like (S207).

When the process of the step S207 is completed, the learning of one round is completed. Since the processing from S203 to S207 is repeated until the number of rounds of learning reaches the upper limit of the number of rounds of learning, the state estimation models are learned until reaching the upper limit of the number of rounds of learning. Repeated learning improves the accuracy of the parameters of the state estimation model.

In general, in order to raise the accuracy of the state estimation model by learning, a sufficient number of rounds of learning are necessary. However, in the present embodiment, since the optimum estimated value calculated from the estimated values of the plurality of state estimation models is used, the estimation error is small and the time until the estimation error converges is shorter than a case where one single state estimation model is used. Accordingly, it is made possible to reduce the number of rounds of learning as compared with the case where one single state estimation model is used.

When the learning reaches the upper limit of the number of rounds of learning, the parameter updater 132 updates the parameters of the state estimation models stored in the storage 12 to newly calculated parameters (S208). This is the end of the flow of the learning processing.

Next, the components of the abnormality detector 13 that carries out the abnormality detection processing will be described below. The abnormality detection processing is carried out by the estimated value calculator 131, the deviation degree calculator 133, the abnormality degree calculator 134, and the abnormality determiner 135.

Figure 9:
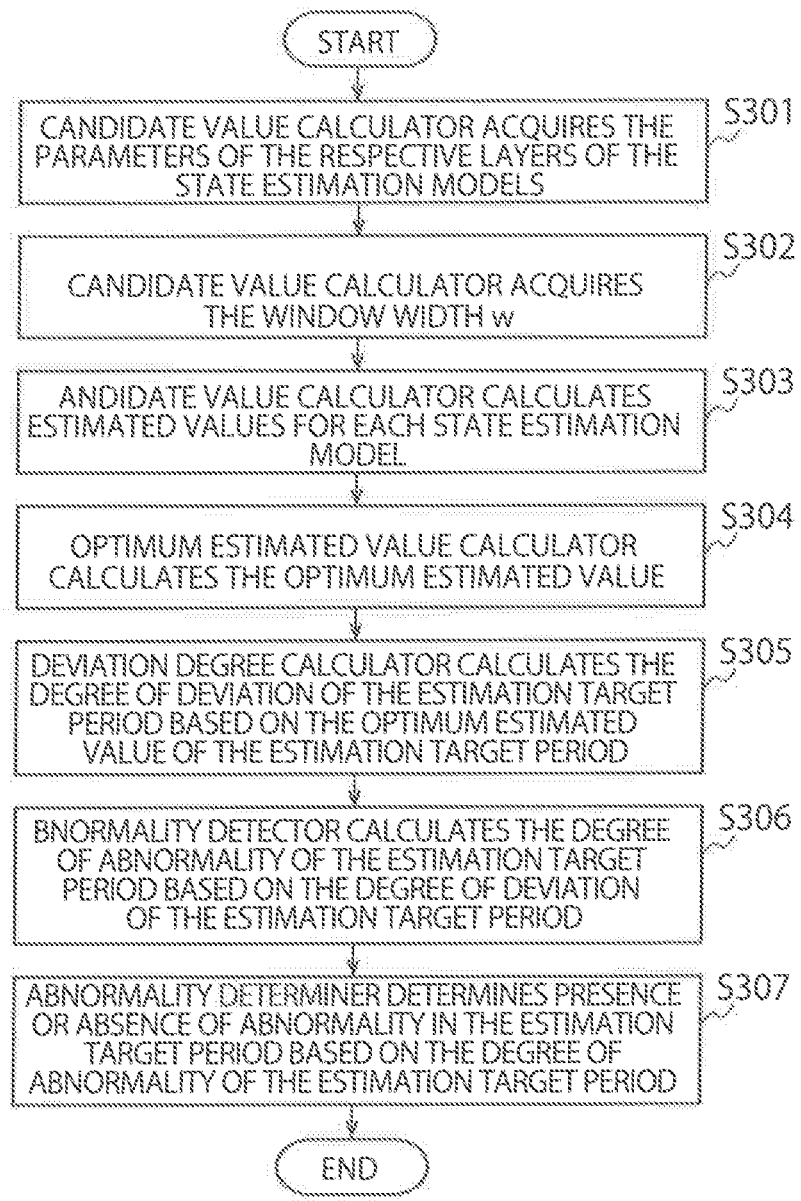
FIG. 9 is a diagram illustrating an example of a flowchart of abnormality detection processing.

The flow of the abnormality detection processing will be described first. FIG. 9 is a diagram that illustrates an example of a flowchart of the abnormality detection processing. The candidate value calculator 1311 acquires the latest parameters after the learning processing of each layer of the state estimation models (S301). Also, the candidate value calculator 1311 acquires the estimation window width "w" (S302).

The candidate value calculator 1311 calculates the estimated value for each state estimation model in the same or similar manner as in the learning processing (S303). At this point, the state data to be used is the evaluation state data, not the learning state data. The remaining aspects are the same as those of the learning processing. The optimum estimated value calculator 1312 then calculates the optimum estimated value from the estimated values for each state estimation model on the basis of the evaluation state values of the estimated target period (S304).

The deviation degree calculator 133 calculates a degree of deviation of the estimation target period on the basis of the optimum estimated value of the estimation target period (S305). The abnormality degree calculator 134 calculates the degree of abnormality in the estimation target period on the basis of the degree of deviation of the estimation target period (S306). Based on the degree of abnormality in the estimation target period, the abnormality determiner 135 determines whether or not an abnormality occurs in the estimation target period (S307). This is the end of the flow of the abnormality detection processing.

The above flowchart is described as a series of processes. Meanwhile, the processing processes from S301 to S304 can be performed as long as estimated data for evaluation in the estimation reference period is available. Accordingly, it is also possible to terminate the processing up to S304 before reaching the estimation target period, and to perform the processing from S305 to S307 after the estimation target period has elapsed. In the present embodiment, abnormality is detected based on estimated data that is based on the state data before occurrence of the abnormality and the state data after occurrence of the abnormality. Accordingly, it is made possible to shorten the time until the abnormality is detected when the estimated data is calculated before the occurrence of the abnormality, for the number of processes performed after the occurrence of the abnormality is small. Thus, the execution timing of the processing up to S304 and the execution timing of the processing after S304 may be separated.

The deviation degree calculator 133, the abnormality degree calculator 134, and the abnormality determiner 135 will be described below. The deviation degree calculator 133 calculates the degree of deviation on the basis of the estimated values of the estimation target period which are based on the evaluation states value of the estimation reference period, and on the basis of the evaluation state values of the same estimation target period.

The degree of deviation is calculated by the method that has been described as the method for calculating the estimation error. The method of calculating the estimation error by the optimum estimated value calculator 1312 and the method of calculating the degree of deviation by the deviation degree calculator 133 do not need to be combined. The degree of deviation is calculated sequentially for each estimated value of the estimation target period.

It is assumed here that the estimated values used by the deviation degree calculator 133 are generated by the estimated value calculator 131, but the deviation degree calculator 133 may calculate the estimated values using the state estimation models updated by the learning processing.

The abnormality degree calculator 134 calculates the degree of abnormality on the basis of the degree of deviation. The degree of abnormality may be calculated on the basis of one degree of deviation or the degree of abnormality may be calculated based on a plurality of degrees of deviation. When it is calculated based on a plurality of degrees of deviation, for example, a degree of abnormality may be calculated by applying a low-pass filter such as a median filter. By doing this, it is made possible to eliminate a degree of deviation which is an outlier. The number or period of degrees of deviation filtered at a time is referred to as "filtering window width f." In addition, a period delimited by the filtering window width "f" is referred to as "filtering window." As a result, the estimation target period is divided by and into a plurality of filtering windows.

When the abnormality degree calculator calculates the degree of abnormality on a per-filtering-window basis, the window width "f" of the filtering window may be adjusted such that the minimum number of samples necessary for the significance probability in the normality test relative to the degree of deviation in the filtering window to exceed the significance level of the normality test agrees with the number of degrees of deviation in the filtering window. By virtue of this, the normality of the degree of deviation included in the filtering window is guaranteed, and the accuracy of the degree of abnormality increases. Also, since the number of samples is the smallest, it is made possible to prevent an outstanding degree of deviation from being hidden behind other degrees of deviation. The method for testing normality may be a known method. Alternatively, the normality test may be performed by an external device or the like, and the window width "f" may be specified for each filtering window via the input device.

Figure 10:
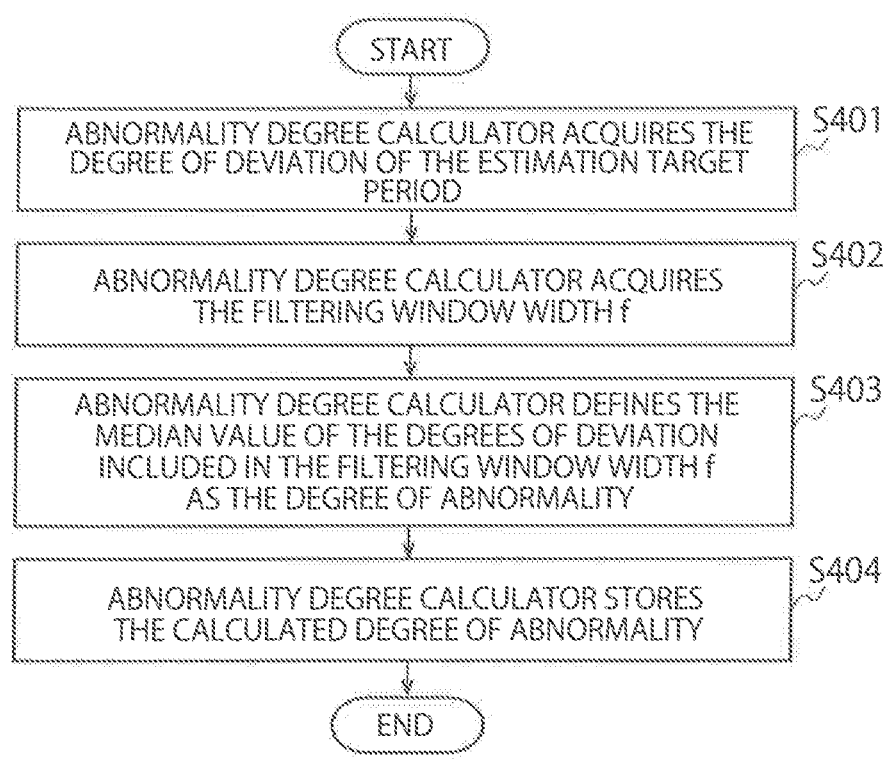
FIG. 10 is a diagram illustrating an example of a flowchart of abnormality degree calculation processing.

FIG. 10 is a diagram that illustrates an example of a flowchart of the processing for obtaining the degree of abnormality. The abnormality degree calculator 134 acquires the degree of deviation of the estimation target period (S401). The abnormality degree calculator 134 acquires the filtering window width "f" (S402). The abnormality degree calculator 134 then calculates a median value of the degrees of deviation included in the filtering window and sets the calculated median value as the degree of abnormality (S403). Since the calculation is performed for each filtering window, the processing process of the step S402 is performed for all the filtering windows within the estimation target period. Thus, the degree of abnormality is calculated over the entire estimation target period. After the calculation is completed, the calculated degrees of abnormality are stored in the storage 12 (S404). It is to be noted that the degree of abnormality may be handed over to the abnormality determiner 135. In this manner, the degree of abnormality in the estimation target period is calculated for each filtering window.

The abnormality determiner 135 determines presence or absence of any abnormality on the basis of the degree of abnormality. If the determination that an abnormality exists is made, then it follows that the abnormality has been in fact detected. The period for determining the presence or absence of the abnormality should be defined within the estimation target period, and it does not necessarily have to coincide with the estimation target period. The period for determining presence or absence of an abnormality is referred to as "abnormality determination period." Also, the abnormality determination period may be identical with the above-described filtering window width "f." The abnormality determination method may be performed based on the presence or absence of a degree of abnormality exceeding an abnormality degree threshold "θ" within a predetermined period. Alternatively, the method may be performed based on whether or not the number or ratio of abnormalities exceeding the threshold value "θ" within a predetermined period exceeds an upper limit value.

It should be noted that each abnormality determination period may be adjusted in the same manner as in the case of the abnormality degree calculator 134. In other words, when the abnormality degree calculator determines presence or absence of an abnormality for each abnormality determination period, the window width "f" of the abnormality determination period may be adjusted such that the minimum number of samples necessary for the significance probability in the normality test relative to the degree of abnormality within the abnormality determination period to exceed the significance level of the normality test agrees with the number of degrees of abnormality within the abnormality determination period. Thus, the normality of the degrees of abnormality included in the abnormality determination period is guaranteed and the accuracy of the abnormality determination is increased. Also, since the number of samples is the smallest, it is made possible to prevent an outstanding degree of abnormality from being hidden behind other degrees of abnormality. The method for testing normality may be a known method. Alternatively, the normality test may be performed by an external device or the like, and the length of each abnormality determination period may be specified via the input device.

Figure 11:
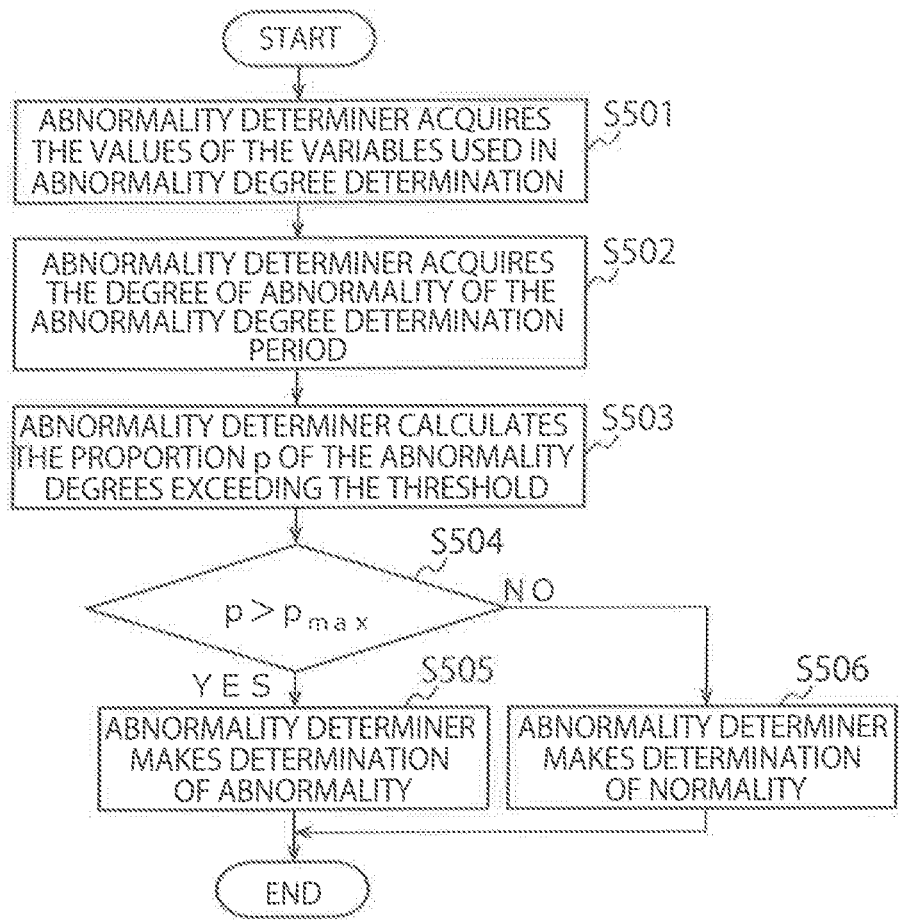
FIG. 11 is a diagram illustrating an example of a flowchart of abnormality determination processing based on a threshold excess ratio.

FIG. 11 is a diagram that illustrates an example of a flowchart of abnormality determination processing based on the threshold excess ratio. In this flow, the abnormality determiner 135 determines presence or absence of an abnormality on the basis of the abnormality degree threshold "θ" and the threshold excess ratio upper limit value "$p_{max}$." The abnormality determiner 135 obtains the values of the variables used in the abnormality degree determination (S501). Examples of the acquired variables include the filtering window width "f," the abnormality degree threshold "θ," the threshold excess ratio upper limit value "$p_{max}$," and the like. Also, the abnormality determiner 135 obtains the degree of abnormality in the abnormality degree determination period (S502). The proportion of the degrees of abnormality exceeding the threshold value to all the degrees of abnormality within the abnormality degree determination period is calculated and set as "p" (S503). When the calculation is performed for each filtering window, the process of S503 is performed for all the filtering windows within the estimation target period. When "p" exceeds the threshold excess ratio upper limit value "$p_{max}$" (YES in S504). It is determined that an abnormality exists (S505). When "p" does not exceed the threshold excess ratio upper limit value "$p_{max}$," it is determined that there is no abnormality, that is, the monitoring target is in a normal state (S506). This is the end of the flow of the abnormality determination processing.

The values of the variables used in the abnormality determination may be defined as appropriate. For example, the abnormality degree threshold "θ" may be a constant multiple of the sum of the average of the degrees of abnormality and the standard deviation.

When the evaluation state data is acquired in real time, the abnormality detection apparatus 1 can detect the abnormality of the monitoring target in real time, but it is more preferable to update the variables such as the abnormality degree threshold "θ" in real time, which will increase the accuracy of the abnormality determination. For example, when the abnormality degree threshold "θ" is calculated based on the average and the standard deviation of the degrees of abnormality, the average and the standard deviation may be updated in real time by using the Welford method.

As the abnormality determination method, a method based on an information amount criterion such as BIC (Bayesian Information Criterion) or MDL (Minimum Description Length) may be used. For example, the abnormality determiner 135 determines whether to divide the time series data of the degrees of abnormality within the abnormality degree determination period on the basis of the information amount of the data. Time series data of the degrees of abnormality is referred to as "abnormality degree data." When it is determined that the abnormality degree data should be divided, the abnormality determiner 135 determines that an abnormality has occurred during the abnormality degree determination period.

If the monitoring target is in a normal state throughout the abnormality degree determination period, the time series data of the degrees of abnormality is determined as one single graph in the abnormality degree determination period, for the degrees of abnormality constituting the time series data will exhibit the same characteristics during the abnormality degree determination period. On the other hand, when an abnormality occurs in the abnormality degree determination period, the time series data of the degrees of abnormality prior to the occurrence of the abnormality will be the one that is obtained when the monitoring target is in a normal state whilst the time series data of the degrees of abnormality after the occurrence of the abnormality will be the one that is obtained when the monitoring target is in an abnormal state. Accordingly, the characteristics of the time series data of the degree of abnormality will be different before and after the occurrence of the abnormality, and it is determined that the state of the monitoring target should be divided into two graphs. In this way, the abnormality determination can be made based on the information amount criterion.

Figure 12:
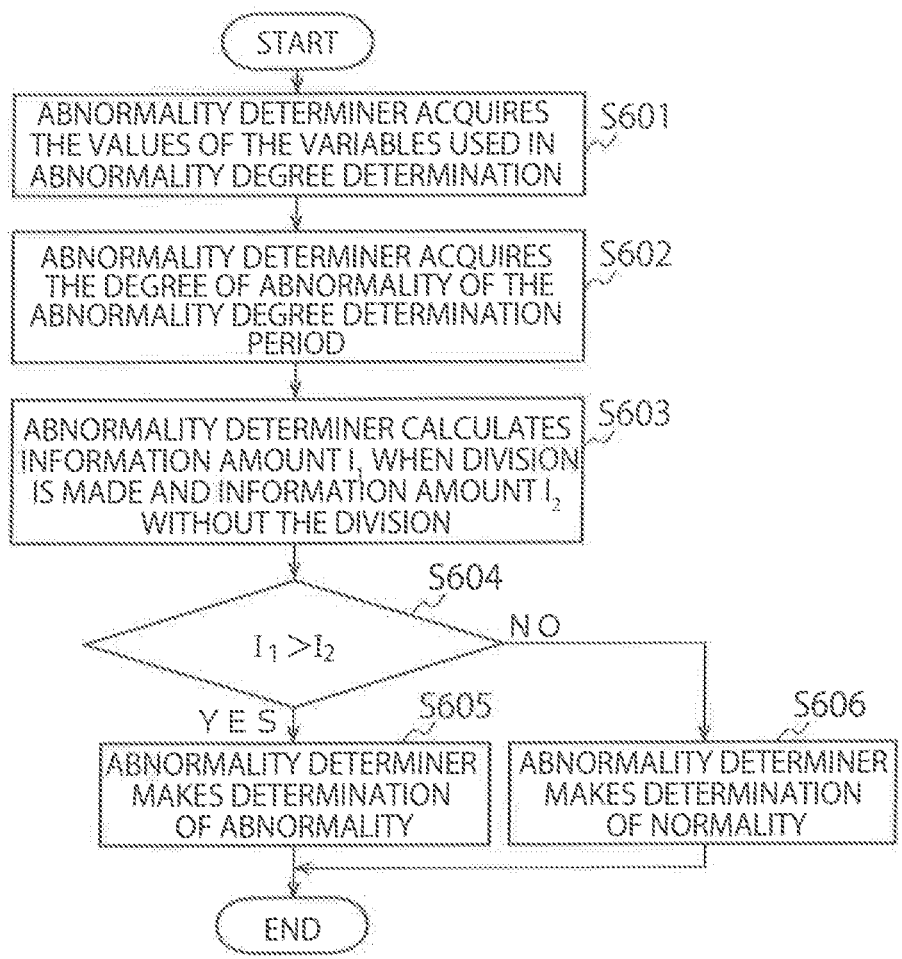
FIG. 12 is a diagram illustrating an example of a flowchart of abnormality determination processing based on an information amount criterion.

FIG. 12 is a diagram that illustrates an example of a flowchart of abnormality determination processing based on information amount criterion. In this flow, the abnormality determiner 135 determines presence or absence of an abnormality from the viewpoint of information amount criterion. The abnormality determiner 135 obtains the values of the variables used in the abnormality degree determination (S601). Examples of the variables to be acquired include information for dividing the abnormality degree determination period, for example, the time point at which the period is to be divided. In addition, the abnormality determiner 135 obtains the degree of abnormality in the abnormality degree determination period (S602). The abnormality determiner 135 compares the information amount $I_1$ (the amount of information in the case where the abnormality degree data is divided) of the abnormality degree data when the abnormality degree determination period is divided at a predetermined time with the information amount $I_2$ in the abnormality degree determination period (the amount of information where the abnormality degree data is not divided) (S603). When the information amount "$I_1$" in the case where the abnormality degree data is divided is larger than the information amount "$I_2$" in the case where the abnormality degree data is not divided (YES in S604), then it is determined that the monitoring target is in an abnormal state (S605). When the information amount "$I_1$" is equal to or smaller than the information amount "$I_2$," it is determined that the monitoring target is in a normal state (S606).

For the abnormality determination, methodology such as statistical testing may be used. For example, when the abnormality degree data in the abnormality degree determination period is divided at a certain time point, a statistical test is performed as to whether the two divided pieces of the abnormality degree data exhibit the same distribution. When a significance probability ("P" value) obtained by the statistical test exceeds a significance level, it is determined that the monitoring target is in an abnormal state, and it is determined that the monitoring target is in a normal state when the former does not exceed the latter.

Figure 13:
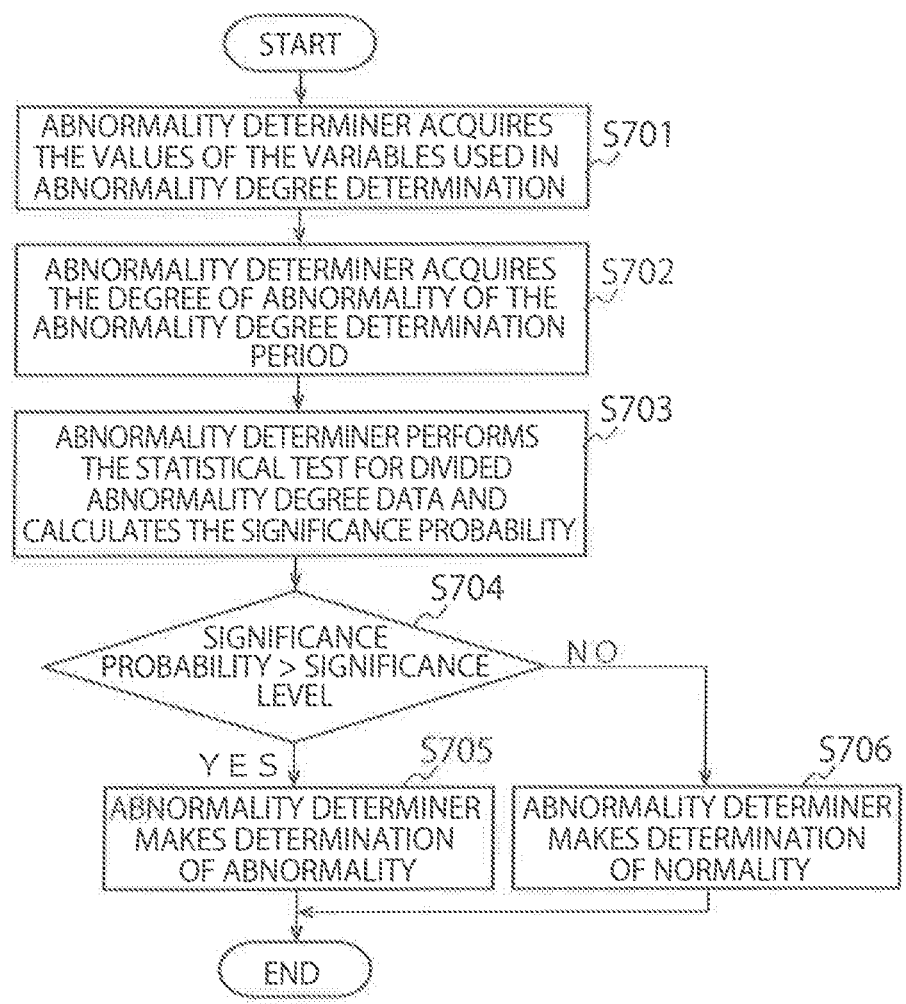
FIG. 13 is a diagram illustrating an example of a flowchart of abnormality determination processing by a statistic test method.

FIG. 13 is a diagram that illustrates an example of a flowchart of abnormality determination processing by a statistic test method. In this flow, the abnormality determiner 135 determines abnormality from the viewpoint of information amount criterion. The abnormality determiner 135 obtains the values of the variables used in the abnormality degree determination (S701). The acquired variables include, for example, information for dividing the abnormality degree determination period and a significance level. In addition, the abnormality determiner 135 acquires the degree of abnormality in the abnormality degree determination period (S702). The abnormality determiner 135 divides the abnormality degree data into two pieces of data, performs a statistical test on the first piece of the abnormality degree data that has been divided and the second piece of the same abnormality degree data, and calculates the significance probability (S703). When the significance probability exceeds the significance level (YES in S704), it is determined that the monitoring target is in an abnormal state (S705). When the significance probability does not exceed the significance level, it is determined that the monitoring target is in a normal state (S706).

Figure 14:
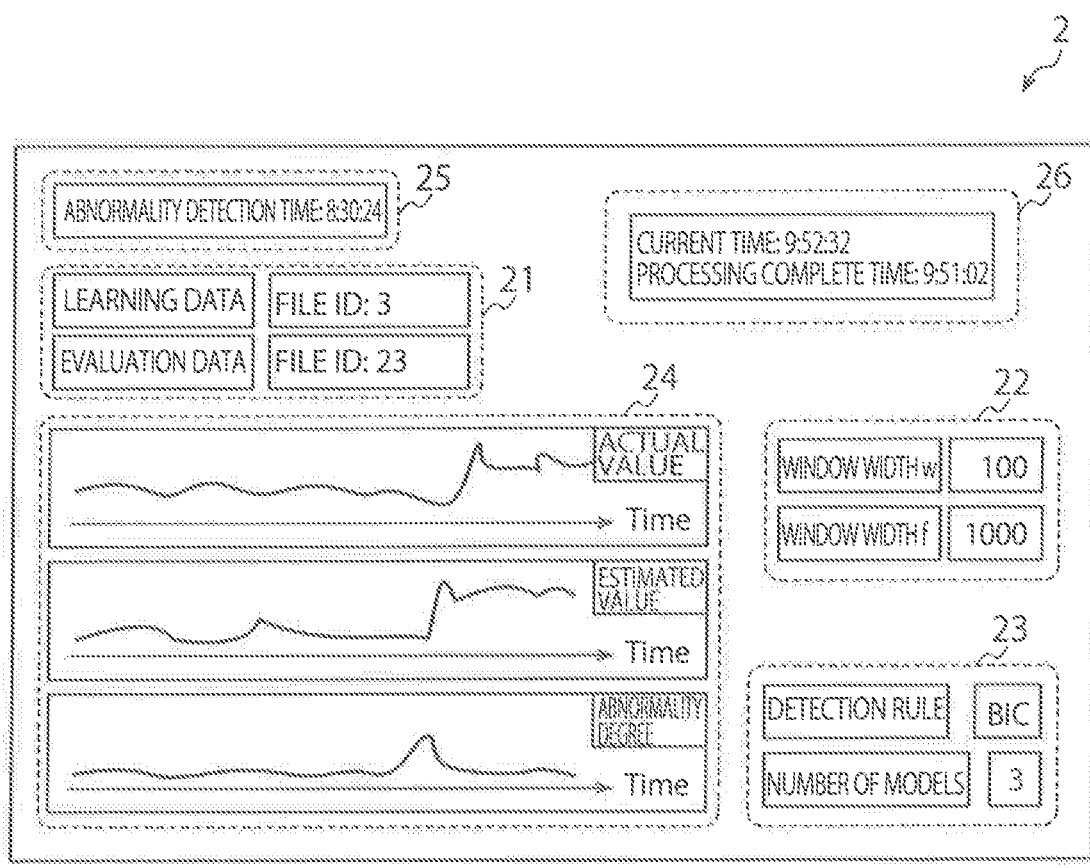
FIG. 14 is a diagram illustrating an example of an output of an output device.

In this manner, the abnormality determination is made. The result of the abnormality determination and the processing result of each component are output by the output device 14 so that the user and the like can recognize the abnormality or the like. FIG. 14 is a diagram that illustrates an example of the output of the output device 14. FIG. 14 illustrates an example in which an image 2 indicative of the abnormality determination result and the like is displayed on a display or the like by the output device 14.

In the image area 21, information on the state data, for example, a file name, a save destination, and the like are displayed. In the image area 22, information of the estimation window and the filtering window, for example, the window widths "w" and "f" are displayed. In the image area 23, variables and the like used in the processing of the abnormality detector 13 are displayed. For example, an abnormality detection rule such as BIC used in the abnormality determination, the number of estimation models used in creating the estimated data, and the like are displayed therein. In the image area 24, graphs of the respective values related to the processing are displayed. For example, graphs of measured values, estimated values, abnormality levels, etc. are displayed therein. Also, which estimated model the estimated value is based upon may be displayed. In the image area 25, information on the abnormality determination, for example, whether the monitoring target is in an abnormal state or a normal state, the latest time when an abnormality was detected, and the like are displayed. In the image area 26, information on time, for example, current time, processing completion time, and the like are displayed.

It should be noted that the displayed information may be modified by the user, and the input device 11 may accept the modified information so that the processing of the abnormality detector 13 may be performed based thereon. By modifying the outputted information, the content of the processing of the abnormality detector 13, for example, the number of state estimation models to be used, the abnormality detection rule, and the like may be changed. By virtue of this, usability for the user of the abnormality detection apparatus 1 can be improved.

As has been described above, according to the present embodiment, a plurality of estimated values of the estimation target period are calculated on the basis of the state values of the estimation reference period, and then the estimated values are compared with the state values of the estimation target period, and thus the optimum estimated value is calculated. In addition, an abnormality is detected based on the optimum estimated value. By virtue of this, the accuracy of the abnormality detection is improved.

Second Embodiment

In a second embodiment, whether or not the optimum estimated value is an outlier value is taken into account when updating the parameters of the state estimation models in the learning processing. If the optimum estimated value is an outlier, the parameters are expected to be adversely affected. Accordingly, the parameters are prevented from being updated based on the optimum estimated value which is an outlier. This reduces the influence of any outlier and further improves the estimation accuracy of the state estimation models.

Figure 15:
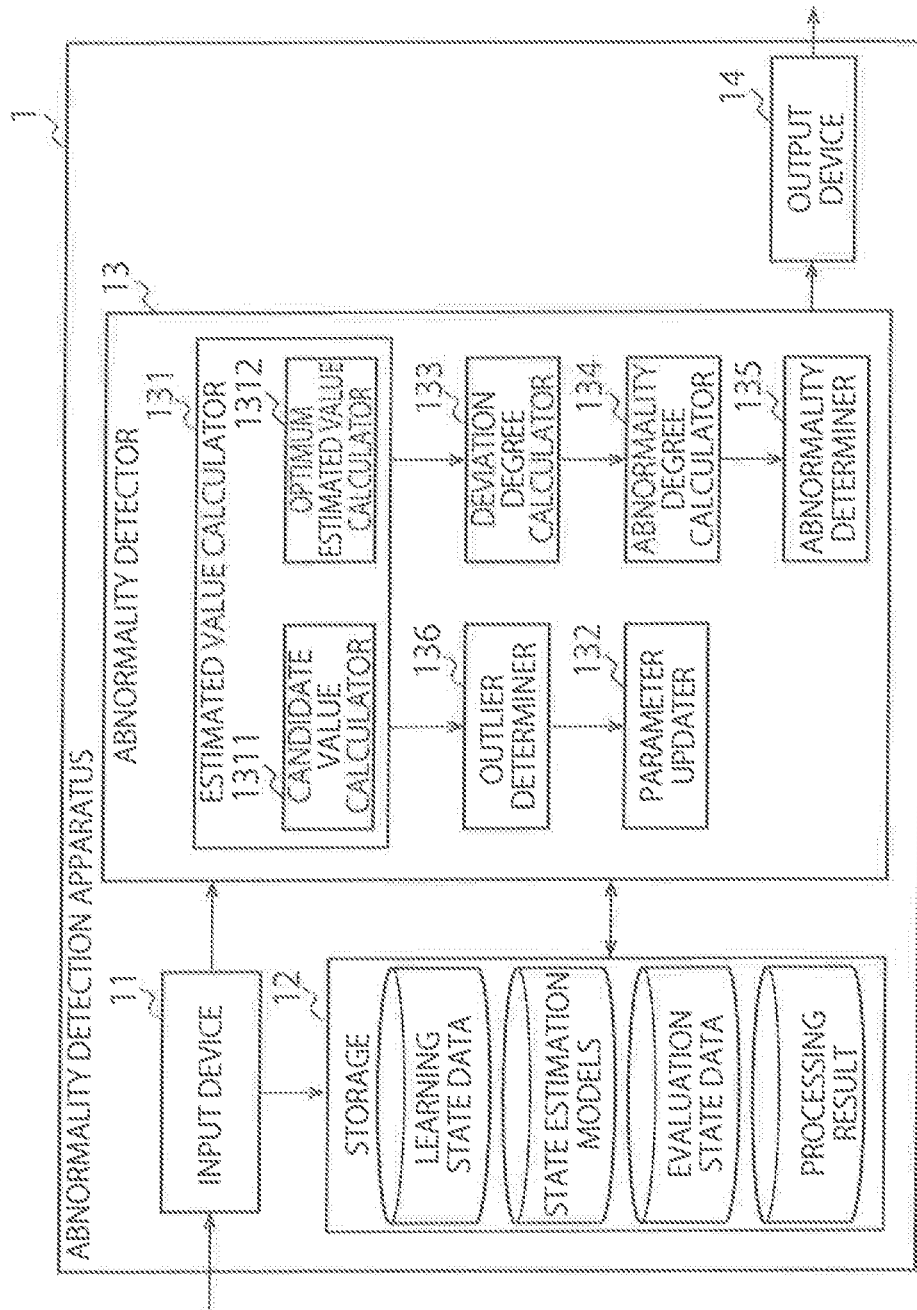
FIG. 15 is a block diagram illustrating an example of a schematic configuration of an abnormality detection apparatus according to a second embodiment.

FIG. 15 is a block diagram that illustrates an example of a schematic configuration of the abnormality detection apparatus 1 according to the second embodiment. The second embodiment differs from the first embodiment in that it further includes an outlier determiner 136. Descriptions of the same aspects as in the first embodiment are not repeated here.

The outlier determiner 136 is configured to determine whether or not the optimum estimated value is an outlier on the basis of a condition for identifying the outlier. The condition for identifying the outlier is referred to as "outlier determination condition."

The outlier determination condition may be a range of values the optimum estimated value can take. In addition, the boundary values defining the possible range may be a static value or a dynamic value. For example, the range of values that can be taken may be changed according to a distribution state of the optimum estimated values or the like. The range of values may be changed as appropriate. For example, when the sum of the average and the standard deviation of the optimum estimated value is larger than a reference value, the range of values that the optimum estimated value can take is widened, whilst the range of values that the optimum estimated value can take is narrowed when the sum is equal to or less than the reference value. The value of the variable relating to the outlier determination condition may be specified or may be calculated by the outlier determiner 136 by a predetermined calculation method.

In addition, the parameter updater 132 then calculates the parameters of the state estimation models on the basis of the optimum estimated value which has not been determined to be an outlier by the outlier determiner 136.

FIG. 16 is a diagram for explanation of the determination of outliers. In FIG. 16, it is assumed that the optimum estimated value is calculated based on a square error. Also, in FIG. 16, it is assumed that the optimum estimated value with an estimated error of 10 or more is determined as being an outlier. The optimal estimated values of the rows with YES indicated in their outlier determination result fields are outliers. The optimum estimated values of the measurement number "t+2" and the measurement number "t+6" are determined to be outliers because the estimated error is not less than 10.

Figure 17:
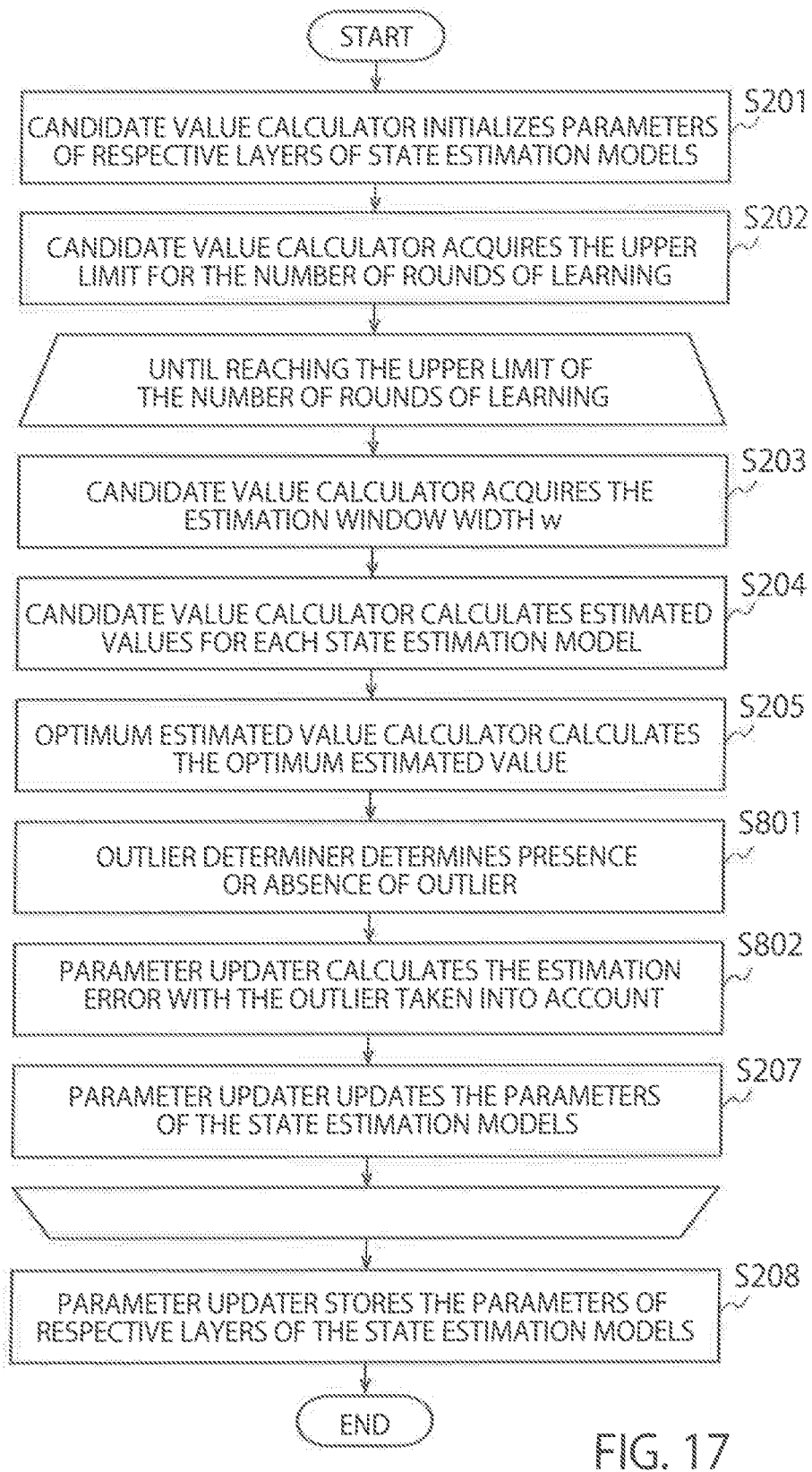
FIG. 17 is a diagram illustrating an example of a flowchart of the learning processing of a state estimation model according to the second embodiment.

FIG. 17 is a diagram that illustrates an example of a flowchart of the learning processing of the state estimation models according to the second embodiment. In this flow, the process of the step S801 is added to the process of the step S205 of the flow illustrated in FIG. 8. Also, the process of S206 is replaced by the process of S802.

The processing from S201 to S205 is the same as in the first embodiment. After the process in S205, the outlier determiner 136 determines whether or not the optimum estimated value is an outlier (S801). The result of the determination is passed to the parameter updater 132. The parameter updater 132 then calculates an estimated error taking into account the determination of the outlier (S802). For example, the estimated error may not be calculated for the optimum estimated value determined to be an outlier. Also, the estimated error with respect to the optimum estimated value determined to be an outlier may be calculated as 0. By virtue of this, the parameters of the state estimation models are updated based on the optimum estimated values not determined to be an outlier. This reduces the influence of the outlier(s). Processing after S207 is also identical with that in the first embodiment.

As described above, according to the present embodiment, the influence of outliers is reduced, and the estimation accuracy of the state estimation model can be further enhanced.

Each process in the embodiments described above can be implemented by software (program). Thus, the embodiments described above can be implemented using, for example, a general-purpose computer apparatus as basic hardware and causing a processor mounted in the computer apparatus to execute the program.

Figure 18:
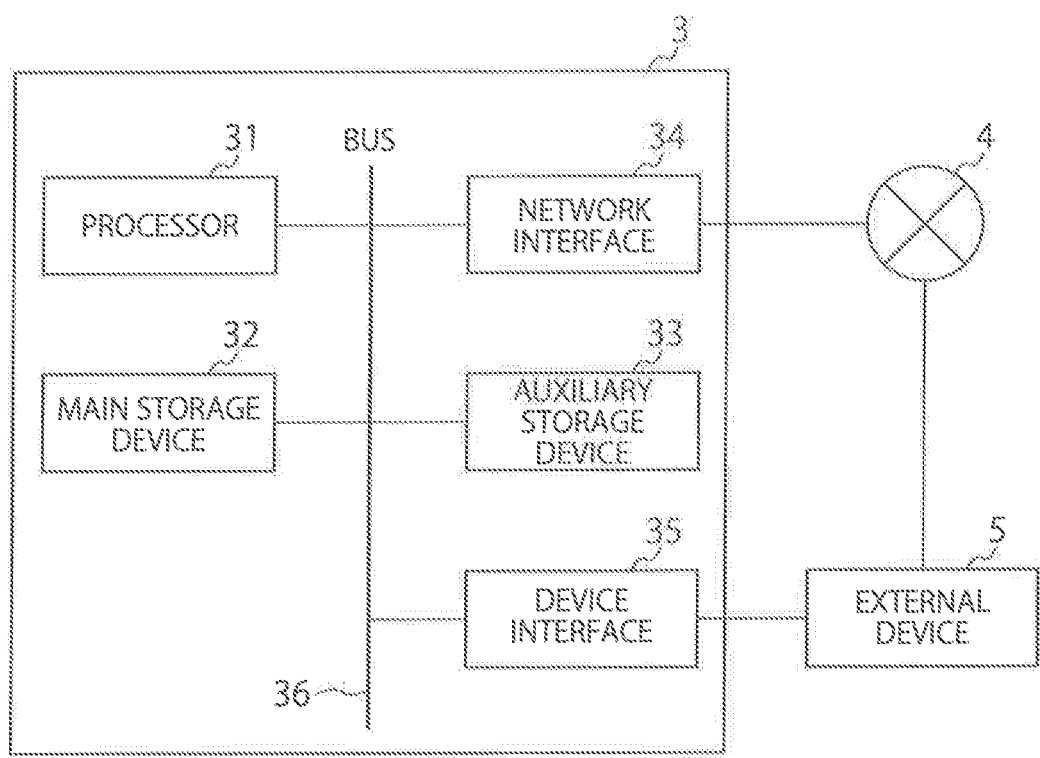
FIG. 18 is a block diagram illustrating an example of a hardware configuration according to an embodiment of the present invention.

FIG. 18 is a block diagram that illustrates an example of a hardware configuration according to an embodiment of the present invention. The abnormality detection apparatus 1 can be realized as a computer device 3 including a processor 31, a main storage 32, an auxiliary storage 33, a network interface 34, and a device interface 35, which are connected via a bus 36. It should be noted that the abnormality detection apparatus 1 may further include an input device and an output device.

The abnormality detection apparatus 1 according to the present embodiment may be realized by installing in advance programs to be executed in each device onto the computer device 3 or by storing the programs in a storage medium such as CD-ROM or distributing the programs in advance via the network 4 and installing the programs onto the computer device 3 as appropriate.

It should be noted that, in FIG. 18, the computer device has one each of the components, but may have two or more of the same components. In addition, although FIG. 18 illustrates one computer device, software may be installed in a plurality of computer devices. Each of the plurality of computer devices may execute processing of different parts of software to generate a processing result. In other words, the abnormality detection apparatus may be configured as a system.

The processor 31 is an electronic circuit including a control device and a computing device of the computer. The processor 31 performs arithmetic processing based on data and programs input from each device or the like constituting the internal configuration of the computer device 3, and outputs calculation results and control signals to each device or the like. More specifically, the processor 31 executes an OS (operating system) of the computer device 3, applications, and the like, and controls each device constituting the computer device 3.

The processor 31 is not particularly limited as long as it can perform the above processing. Processor 31 may be, for example, a general purpose processor, a central processing unit (CPU), a microprocessor, a digital signal processor (DSP), a controller, a microcontroller, or a state machine. In addition, the processor 31 may be incorporated in an application specific integrated circuit, a field programmable gate array (FPGA), or a programmable logic circuit (PLD). Also, the processor 31 may be composed of a plurality of processing devices. For example, it may be a combination of a DSP and a microprocessor, or it may be one or more microprocessors working with a DSP core.

The main storage 32 is a storage that stores instructions that are executed by the processor 31, various data, and the like, and the information stored in the main storage 32 is read directly by the processor 31. The auxiliary storage 33 is a storage other than the main storage 32. It should be noted that the storage is intended to mean any electronic component capable of storing electronic information. As the main storage 32, a volatile memory used in storing temporary information such as RAM, DRAM, SRAM or the like is mainly used, but in the embodiment of the present invention, the main storage 32 is not limited to these volatile memories. The storage used as the main storage 32 and the auxiliary storage 33 may be a volatile memory or a nonvolatile memory. The nonvolatile memory may be programmable read only memory (PROM), erasable programmable read only memory (EPROM), electrically erasable PROM (EEPROM), nonvolatile random access memory (NVRAM), flash memory, MRAM, or the like. Magnetic or optical data storages may also be used as the auxiliary storage 33. As the data storage, a magnetic disk such as a hard disk, an optical disk such as a DVD, a flash memory device such as USB, a magnetic tape, or the like may be used.

It should be noted that if the processor 31 reads and/or writes information directly or indirectly to/from the main storage 32 or the auxiliary storage 33. It can be said that the storage electrically communicates with the processor. It should be noted that the main storage 32 may be integrated in the processor. Also in this case, it can be said that the main storage 32 is in electrical communication with the processor.

The network interface 34 is an interface for wired or wireless connection to a communication network. As the network interface 34, any appropriate one complying with existing communication standards may be used. An output result or the like may be transmitted to the external device 5 communicably connected via the communication network 4 by the network interface 34. The external device 5 may be an external storage medium, a display, or a storage such as a database.

The device interface 35 is an interface such as a USB for connection to an external storage medium that records output results and the like. The external storage medium may be any recording medium such as HDD, CD-R, CD-RW, DVD-RAM, DVD-R, SAN (storage area network). Connection may be made to a storage or the like via the device interface 35.

Also, part or all of the computer device 3, that is, a part or the whole of the abnormality detection apparatus 1 may be configured by a dedicated electronic circuit (i.e., hardware) such as a semiconductor integrated circuit on which the processor 31 and the like are mounted. The dedicated hardware may be configured in combination with a storage such as RAN, ROM, or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An abnormality detection apparatus detecting an abnormality of a monitoring target on the basis of a state value indicative of a state of the monitoring target, the apparatus comprising:
   an estimated value calculator configured to calculate estimated values which are state values of estimation of a second period after a first period, the estimated values being calculated on the basis of state values of the first period, state values of the second period, and a plurality of state estimation models;
   a deviation degree calculator configured to calculate a degree of deviation on the basis of the state value in the second period and the estimated value of the second period;
   an abnormality degree calculator configured to calculate a degree of abnormality on the basis of the degree of deviation;
   an abnormality determiner configured to determine presence or absence of an abnormality of the monitoring target on the basis of the degree of abnormality; and
   a parameter updater configured to update parameters of the state estimation models,
   wherein
      the estimated value calculator is configured to:
         calculate, on the basis of the state estimation models and state values of a third period in which the monitoring target is normal, a plurality of estimated values of a fourth period after the third period, and
         calculate an estimated value regarded as being optimum of the fourth period on the basis of the state values of the fourth period and the estimated values of the fourth period; and
      the parameter updater updates the parameters of the state estimation models on the basis of the estimated value regarded as being optimum of the fourth period.

2. The abnormality detection apparatus according to claim 1, wherein the estimated value calculator is configured to calculate the estimated value regarded as being optimum by selection from the estimated values of the fourth period on the basis of the state values of the fourth period.

3. The abnormality detection apparatus according to claim 1, further comprising an outlier determiner configured to determine whether or not the value of the estimated value is an outlier, wherein the parameter updater updates the parameters of the state estimation models on the basis of the values of the estimated values of the fourth period not determined to be an outlier.

4. The abnormality detection apparatus according to claim 1, wherein the degree of deviation is calculated on the basis of a difference between the state values of the second period and the estimated values of the second period.

5. The abnormality detection apparatus according to claim 1, wherein the abnormality degree calculator sets a median value of a plurality of the degrees of deviation as the degree of abnormality.

6. The abnormality detection apparatus according to claim 1, wherein
   the abnormality determiner performs a statistical test on the degree of abnormality in a fifth period within the second period and the degree of abnormality in a sixth period within the second period, and
   an abnormality is determined to exist when a significance probability calculated by the statistical test exceeds a significance level of the statistical test.

7. The abnormality detection apparatus according to claim 1, wherein an abnormality is determined to exist when a sum of an information amount of the degree of abnormality in a fifth period within the second period and an information amount of the degree of abnormality in a sixth period within the second period is larger than an information amount of the degree of abnormality in the second period.

8. The abnormality detection apparatus according to claim 1, wherein
   when the abnormality degree calculator calculates the degree of abnormality for each of a plurality of seventh periods dividing the second period, a minimum number of samples necessary for a significance probability in a first normality test relative to the degree of deviation within the seventh period to exceed a significance level of the first normality test agrees with a number of the degrees of deviation within the seventh period; and
   when the abnormality determiner determines the presence or absence of the abnormality of the monitoring target for each of a plurality of eighth periods dividing the second period, a minimum number of samples necessary for a significance probability in a second normality test relative to the degree of abnormality in the eighth period to exceed a significance level of the second normality test agrees with a number of the degrees of abnormality in the eighth period.

9. The abnormality detection apparatus according to claim 1, further comprising an output device configured to output at least one of a determination result of the abnormality determiner, the degree of abnormality, the degree of deviation, and the estimated values.

10. A method for detecting an abnormality of a monitoring target on the basis of a state value indicative of a state of the monitoring target, the method comprising:
    calculating estimated values which are state values of estimation of a second period after a first period, the estimated values being estimated on the basis of state values of the first period, wherein the estimated values indicate a state of the monitoring target estimated in the second period;
    calculating a degree of deviation of the second period on the basis of the state values of the second period and the estimated values of the second period;
    calculating a degree of abnormality in the second period on the basis of the degree of deviation in the second period;
    determining presence or absence of an abnormality of the monitoring target in the second period on the basis of the degree of abnormality in the second period;
    calculating, on the basis of the state estimation models and state values of a third period in which the monitoring target is normal, a plurality of estimated values of a fourth period after the third period;

calculating an estimated value regarded as being optimum of the fourth period on the basis of the state values of the fourth period and the estimated values of the fourth period; and updating the parameters of the state estimation models on the basis of the estimated value regarded as being optimum of the fourth period.

11. A non-transitory computer readable medium having a computer program stored therein which causes a computer when executed by the computer, to perform processes comprising:

calculating estimated values which are state values of estimation of a second period after a first period, the estimated values being estimated on the basis of state values of the first period, wherein the estimated values indicate a state of the monitoring target estimated in the second period;

calculating a degree of deviation of the second period on the basis of the state values of the second period and the estimated values of the second period;

calculating a degree of abnormality in the second period on the basis of the degree of deviation in the second period;

determining presence or absence of an abnormality of the monitoring target in the second period on the basis of the degree of abnormality in the second period;

calculating, on the basis of the state estimation models and state values of a third period in which the monitoring target is normal, a plurality of estimated values of a fourth period after the third period;

calculating an estimated value regarded as being optimum of the fourth period on the basis of the state values of the fourth period and the estimated values of the fourth period; and updating the parameters of the state estimation models on the basis of the estimated value regarded as being optimum of the fourth period.

* * * * *